United States Patent
Sakano

(10) Patent No.: US 8,150,619 B2
(45) Date of Patent: Apr. 3, 2012

(54) DEVICE AND PROGRAM PRODUCT FOR CONTROLLING MAP DISPLAY

(75) Inventor: Hirokazu Sakano, Tokai (JP)

(73) Assignee: DENSO CORPORATION, Kariya (JP)

( * ) Notice: Subject to any disclaimer, the term of this patent is extended or adjusted under 35 U.S.C. 154(b) by 1294 days.

(21) Appl. No.: 11/826,553

(22) Filed: Jul. 17, 2007

(65) Prior Publication Data

US 2008/0027637 A1 Jan. 31, 2008

(30) Foreign Application Priority Data

Jul. 31, 2006 (JP) ................................. 2006-207649

(51) Int. Cl.
*G01C 21/30* (2006.01)
(52) U.S. Cl. ....................... 701/410; 701/455
(58) Field of Classification Search .................. 701/201, 701/208–212; 340/990, 995
See application file for complete search history.

(56) References Cited

U.S. PATENT DOCUMENTS

| | | | |
|---|---|---|---|
| 5,612,881 A | 3/1997 | Moroto et al. | |
| 5,787,383 A | 7/1998 | Moroto et al. | |
| 6,067,502 A * | 5/2000 | Hayashida et al. | 701/209 |
| 6,453,236 B1 * | 9/2002 | Aoki | 701/211 |
| 6,836,728 B2 * | 12/2004 | Shimabara | 701/212 |
| 7,844,395 B2 * | 11/2010 | Aoyama | 701/212 |
| 2003/0120423 A1 * | 6/2003 | Cochlovius et al. | 701/212 |

FOREIGN PATENT DOCUMENTS

| | | | |
|---|---|---|---|
| JP | 7-181051 A | | 7/1995 |
| JP | 7-218279 A | | 8/1995 |
| JP | 9-062185 A | | 3/1997 |
| JP | 11-295085 A | | 10/1999 |
| JP | 11295085 A | * | 10/1999 |
| JP | 2000230839 A | * | 8/2000 |
| JP | 2002-132447 A | | 5/2002 |
| JP | 2004-271439 A | | 9/2004 |
| JP | A-2004-317289 | | 11/2004 |
| JP | A-2005-55288 | | 3/2005 |
| JP | 2006-017478 A | | 1/2006 |
| JP | 2006-029917 A | | 2/2006 |

OTHER PUBLICATIONS

Office Action mailed Jan. 18, 2011 issued in corresponding JP patent application No. 2006-207649 (English translation enclosed).

* cited by examiner

*Primary Examiner* — Isam Alsomiri
(74) *Attorney, Agent, or Firm* — Posz Law Group, PLC

(57) ABSTRACT

An automobile navigation system determines whether or not the relevant vehicle is traveling and whether or not routing assistance is being provided. When the results of both the determinations are affirmative, a displayed map image is scrolled by an amount of scrolling corresponding to the size of a guided route in response to an operation to a touch panel for scrolling, and, further, the scale of the display map image is changed by an amount of change corresponding to the size of the guided route in response to an operation to the touch panel for scale change.

18 Claims, 4 Drawing Sheets

DEVICE AND PROGRAM PRODUCT FOR CONTROLLING MAP DISPLAY

CROSS REFERENCE TO RELATED APPLICATION

This application is based on and incorporates herein by reference Japanese Patent Application No. 2006-207649 filed on Jul. 31, 2006.

FIELD OF THE INVENTION

The present invention relates to a map display control device for automobile use and a program product for map display control.

BACKGROUND OF THE INVENTION

In Patent Document 1, there have been conventionally disclosed map display control devices constructed so as to be mounted in a vehicle and cause an image display device to display a map. The map display control device disclosed in Patent Document 1 controls an amount of map scrolling corresponding to a user's operation so that the amount is larger when the relevant vehicle is traveling than when the vehicle is parked.
Patent Document 1: JP-07-181051 A (JP-2809074 B2)

However, when a map display control device is provided with a navigation function for providing routing assistance to guide the driver to his/her destination, it may be desirable to implement the following: when the user performs some operation for scrolling, the amount of scrolling is varied depending on whether or not routing assistance is being provided.

SUMMARY OF THE INVENTION

In consideration of the foregoing, a first object of the invention is to implement the following with respect to an in-vehicle map display control device that causes an image display device to display a map: when a user performs some operation to scroll a map being displayed on the image display device, the amount of scrolling is varied depending on whether or not routing assistance is being provided.

When a user performs some operation for scrolling, it may be desirable to vary the amount of scrolling according to the scale of the currently displayed map.

In consideration of the foregoing, a second object of the invention is to implement the following with respect to an in-vehicle map display control device that causes an image display device to display a map: when a user performs some operation to scroll a map being displayed on the image display device, the amount of scrolling is varied according to the scale of the currently displayed map.

When a user performs some operation to change the scale of the map being displayed on the image display device, it may be desirable to make the amount of scale change different between when the vehicle is traveling and when the vehicle is parked. An example of this case is a case where continuous scale change during vehicle traveling is prohibited to comply with regulations related to traveling. (Other examples are: a case where it is prohibited to comply with regulations related to operation during driving voluntarily set by Japan Automobile Manufacturers Association, Inc.; and a case where it is prohibited to avoid a violation of a provision of the Road Traffic Act related to the use of a cellular phone during driving or the like.)

In consideration of the foregoing, a third object of the invention is to implement the following with respect to an in-vehicle map display control device that causes an image display device to display a map: when a user performs some operation to change the scale of the map being displayed on the image display device, the amount of scale change is made different between when the vehicle is traveling and when the vehicle is parked.

When a map display control device is provided with a navigation function for providing routing assistance to guide the driver to his/her destination, it may be desirable to implement the following: when the user performs some operation to change the scale of the map being displayed on the image display device, the amount of scale change is varied depending on whether or not routing assistance is being provided.

In consideration of the foregoing, a fourth object of the invention is to implement the following with respect to an in-vehicle map display control device that causes an image display device to display a map: when a user performs some operation to change the scale of the map being displayed on the image display device, the amount of scale change is varied depending on whether or not routing assistance is being provided to guide the driver to his/her destination.

According to a first example of the invention to attain the above objects, a map display control device that is mounted in a vehicle and includes an operation unit for accepting a user's operation and a routing assistance function for guiding the user to his/her destination carries out the following processing: it determines whether or not routing assistance is being provided and determines an amount of scrolling based on the result of this determination. Further, the map display control device causes an image display device to display a map image. Furthermore, in response to the acceptance of an operation for scrolling by the operation unit, the map display control device scrolls the map image by the amount of scrolling determined as mentioned above.

According to a second example of the invention, a map display control device that is mounted in a vehicle and includes an operation unit for accepting a user's operation and a drawing control function for causing an image display device to display a map image carries out the following processing: it determines a larger amount of scrolling with increase in the scale of the map image being displayed. Further, in response to the acceptance of an operation for scrolling by the operation unit, the map display control device scrolls the map image by the amount of scrolling determined by an amount of scrolling determination unit.

According to a third example of the invention, a map display control device that is mounted in a vehicle and includes an operation unit for accepting a user's operation carries out the following processing: it determines whether or not the vehicle is traveling and determines an amount of change in scale for map display based on the result of this determination. The map display control device causes an image display device to display a map image. Further, it changes the scale of the displayed map image by the amount of change determined as mentioned above, in response to the acceptance of an operation for scale change by the operation unit.

According to a fourth example of the invention, a map display control device that is mounted in a vehicle and includes an operation unit for accepting a user's operation and a routing assistance function for guiding the user to his/her destination carries out the following processing: it determines whether or not routing assistance is being provided and determines an amount of change in scale for map display based on the result of this determination. The map display control device causes an image display device to display a map image. Further, it changes the scale of the displayed map image by the determined amount of change in response to the acceptance of an operation for scale change by the operation unit.

Further, the above examples can be achieved as individual computer program products in computer-readable media, the product having instructions for executing functions of the corresponding comprised elements.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
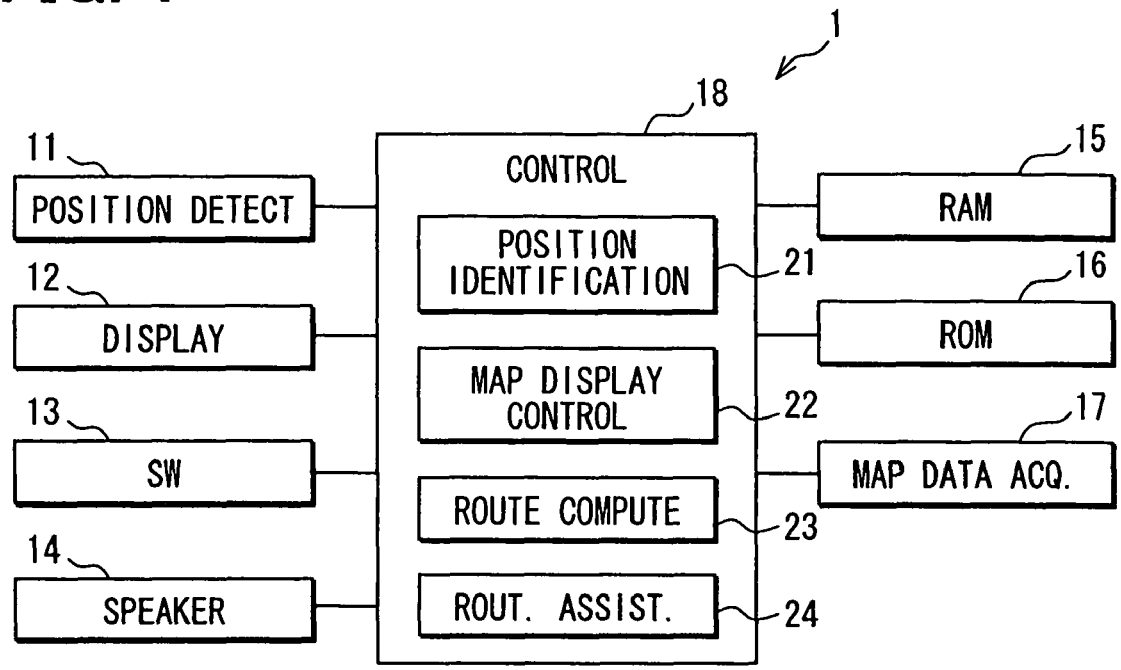
FIG. 1 is a block diagram illustrating a hardware configuration of an automobile navigation system in an embodiment.

Hereafter, description will be given to an embodiment. FIG. 1 illustrates the hardware configuration of an automobile navigation system 1 in this embodiment. This automobile navigation system 1 includes: a position detector 11, an image display device 12, an operation switch group 13, a speaker 14, RAM 15, ROM 16, a map data acquisition unit 17, and a control circuit 18.

The position detector 11 includes publicly known sensors such as a geomagnetic sensor, a gyroscope, a vehicle speed sensor, and a GPS receiver none of which is shown in the drawing. The position detector outputs to the control circuit 18 information for identifying the current position and the direction of the relevant vehicle based on the properties of each of these sensors. The image display device 12 displays a screen image based on an image signal outputted from the control circuit 18 so that a user can visually identify it.

The operation switch group 13 is constructed of: multiple mechanical switches provided in the automobile navigation system 1; an input device such as a touch panel provided over the display surface of the image display device 12; and the like. When a user presses a mechanical switch or touches the touch panel, the operation switch group 13 outputs a corresponding signal to the control circuit 18.

The map data acquisition unit 17 is constructed of: a non-volatile storage medium such as HDD, DVD-ROM, or CD-ROM and a device for reading data from (and, if possible, writing data to) this storage medium. The map data acquisition unit stores a program executed by the control circuit 18, map data for routing assistance, and the like.

The map data includes road data and facility data. The road data includes position information and classification information associated with links, position information and classification information associated with nodes; information on junctions between nodes and links; and the like. The facility data includes multiple records with respect to each facility, and each record includes data indicating name information, location information, address information, phone number information, postal code information, facility type information, and the like with respect to each covered facility.

The control circuit (equivalent to a computer or control unit) 18 executes a program for the operation of the automobile navigation system 1, read from the ROM 16 or the map data acquisition unit 17. When executing a program, the control circuit 18 reads information from the RAM 15, ROM 16, and map data acquisition unit 17, and writes information to the RAM 15 and the map data acquisition unit 17. Further, it communicates signals between it and the position detector 11, image display device 12, operation switch group 13, and speaker 14.

Processing carried out by the control circuit 18 executing a program includes current position identification processing 21, map display control processing 22, guided route computation processing 23, routing assistance processing 24, and the like.

The current position identification processing 21 is used to identify the current position, traveling speed, direction, and the like of the vehicle based on a signal from the position detector 11 using a publicly known technique such as map matching.

The map display control processing 22 is used: to acquire part of map data through the map data acquisition unit 17 according to the current position identified by the current position identification processing 21, the operation through the operation switch group 13, and a request from other processing; to generate a map image with respect to the acquired part based on road data and facility data contained therein; and to cause the image display device 12 to draw a map using the generated map data.

The guided route computation processing 23 is used to compute an optimum guided route from the current position identified by the current position identification processing 21 to a destination inputted by a user using the operation switch group 13.

The routing assistance processing 24 is used to assist the driver in driving his/her vehicle along a guided route. Specifically, the following operation is carried out in the routing assistance processing 24: based on the result of the current position identification processing 21, the control circuit 18 monitors whether or not the relevant vehicle has approached a guided intersection, which is an intersection at which it should make a right turn or a left turn in accordance with a guided route; when the relevant vehicle has approached a guided intersection, the control circuit 18 instructs the driver which direction to take or the like by voice or image. To give an instruction by voice, the speaker 14 is used. To give an instruction by image, the map display control processing 22 is requested to display an enlarged view of the intersection. The routing assistance processing 24 is started when a user operates the operation switch group 13 to start the routing assistance processing 24 and is terminated when the relevant vehicle arrives at the destination.

Figure 2:
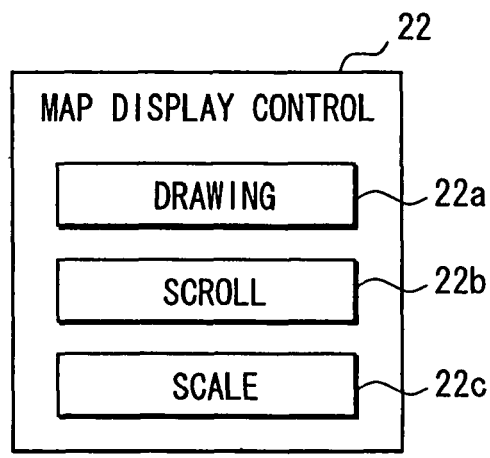
FIG. 2 is a block diagram illustrating a structure of map display control processing.

Hereafter, detailed description will be given to the map display control processing 22. As illustrated in FIG. 2, the map display control processing 22 includes three pieces of processing: drawing control processing 22a, scroll control processing 22b, and scale control processing 22c.

The drawing control processing 22a is such that: based on a position on a map specified by the scroll control processing 22b (hereafter, the position is referred to as drawing center) and a scale specified by the scale control processing 22c, a map image with the drawing center situated at the center is generated to the scale; and a signal for drawing this map image is outputted to the image display device 12.

The scroll control processing 22*b* is such that: based on a user's operation with the operation switch group 13, the traveling state of the vehicle, the operating state of the automobile navigation system 1, and the like, a drawing center to be specified for the drawing control processing 22*a* is determined; and the specification of the determined drawing center is passed to the drawing control processing 22*a*. When the specified drawing center is changed, the map image is moved in the display screen of the image display device 12 with this change. That is, the map image is scrolled.

The scale control processing 22*c* is such that: based on a user's operation with the operation switch group 13, the traveling state of the vehicle, the operating state of the automobile navigation system 1, and the like, a scale to be specified for the drawing control processing 22*a* is determined; and the specification of the determined scale is passed to the drawing control processing 22*a*.

Figure 3:
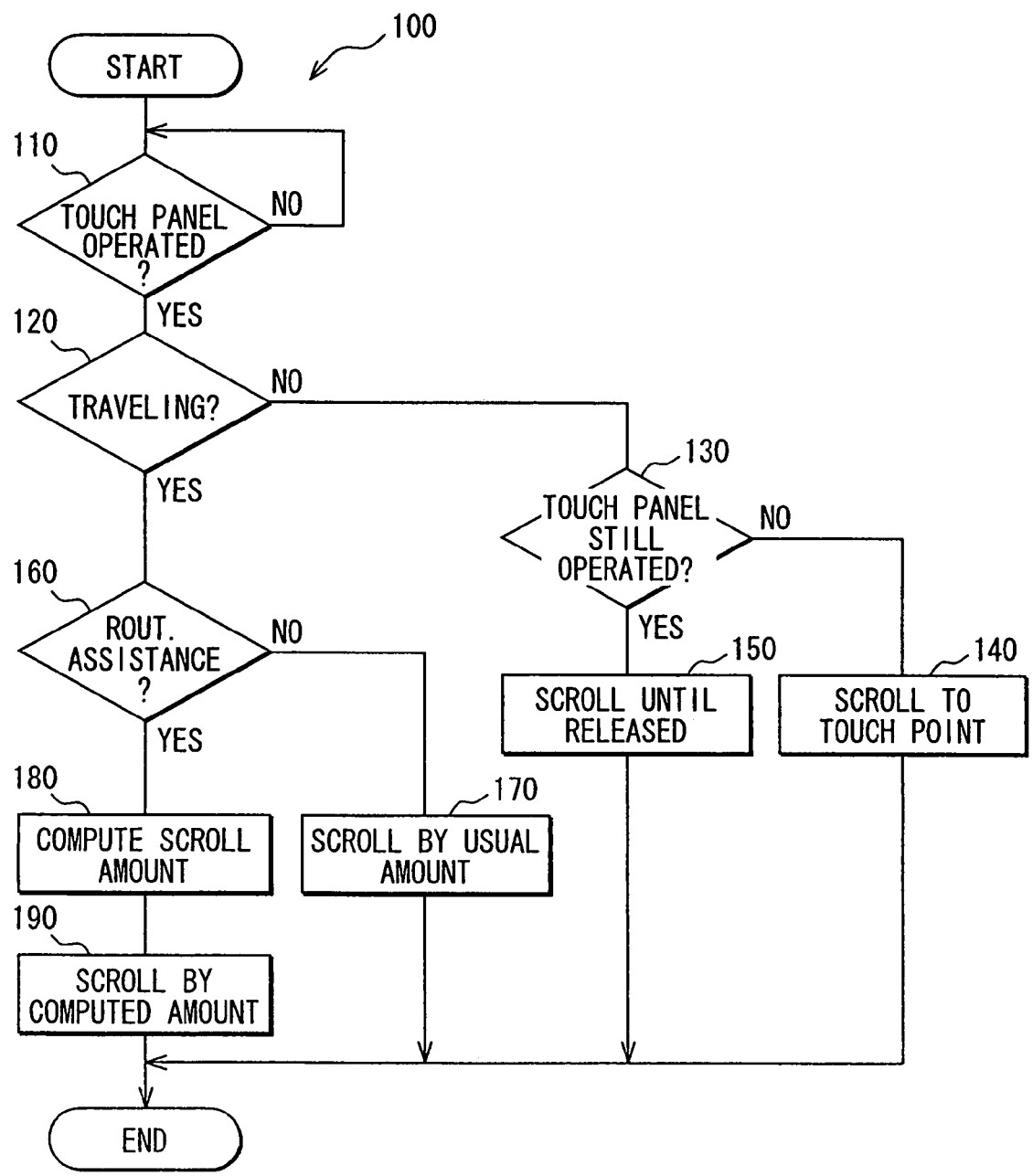
FIG. 3 is a flowchart of a scroll control program executed by a control circuit.

The scroll control processing 22*b* will be described in detail. In the scroll control processing 22*b*, the control circuit 18 repeatedly executes the scroll control program 100 illustrated in FIG. 3. The program is executed for determining a drawing center (i.e., for carrying out scroll control) according to a user's operation with the touch panel of the operation switch group 13.

The scroll control program 100 is executed as follows. At Step 110, the control circuit 18 waits until the touch panel of the operation switch group 13 is operated. When it is operated, subsequently, the control circuit 18 determines at Step 120 whether or not the relevant vehicle is traveling. This determination is made based on, for example, whether or not the traveling speed identified by the current position identification processing 21 is equal to or higher than a predetermined speed (e.g., 0.5 km per hour). When the vehicle is traveling, the control circuit 18 proceeds to Step 160. When the vehicle is not traveling, the control circuit 18 proceeds to Step 130.

At Step 130, it is determined whether or not the touch panel operation is still going on, that is, whether or not the user's finger is in contact with the touch panel. When the touch panel operation is going on, the control circuit 18 proceeds to Step 150. When the touch panel operation is not going on, the control circuit 18 proceeds to Step 140.

At Step 140, the map image is moved until the point on the map situated in a position on the display screen corresponding to the touched position (hereafter, referred to as touch point) arrives at the center of the display screen. That is, the map image is scrolled until the touch point arrives at the center of the display screen. Specifically, the following processing is carried out: one or more points are extracted from the straight line from the map position corresponding to the center of the current display screen image (hereafter, referred to as original point) to the position of the touch point; and the extracted points are passed as the drawing center to the drawing control processing 22*a* in the order of the direction from the original point to the touch point. Thus, the map image is scrolled so that the touch point is positioned at the center in the display screen of the image display device 12.

At this time, the number of points passed as the drawing center may be large to the extent that the movement of the map image appears smooth. (For example, the number of points passed as the drawing center may be of the same order as the number of dots of the display screen from the original point to the touch point.) Or, the number of points passed as the drawing center may be to the extent that the movement of the map image appears stepwise. (For example, the number of points passed as the drawing center may be of the order of 1/10 of the number of dots of the display screen from the original point to the touch point.) Or, only the touch point may be passed as the drawing center. In this case, the map image scrolls in one stroke as if it jumped from the state in which the original point is positioned at the center of the display screen to the state in which the touch point is positioned at the center of the display screen. When the processing of Step 140 is completed, one run of the scroll control program 100 is terminated.

At Step 150, the map image is continuously scrolled until the touching operation is released, that is, the user's finger is detached from the touch panel. Specifically, the following processing is carried out while the touching operation is going on: multiple points on the straight line originating at the original point and traveling through the touch point are extracted; and the extracted points are periodically passed as the drawing center to the drawing control processing 22*a* in the order of the direction from the original point to the touch point. Thus, the map image is scrolled at a constant speed as long as the touching operation is being performed. The speed of scrolling may be increased with increase in the distance from the original point to the touch point on the display screen. When the processing of Step 150 is completed, one run of the scroll control program 100 is terminated.

When the result of determination made at Step 120 is affirmative, the control circuit 18 proceeds to Step 160, and determines whether or not the automobile navigation system 1 is carrying out the routing assistance processing 24. When the processing is in execution, the control circuit 18 proceeds to Step 180. When the processing is not in execution, the control circuit 18 proceeds to Step 170.

Figure 4:
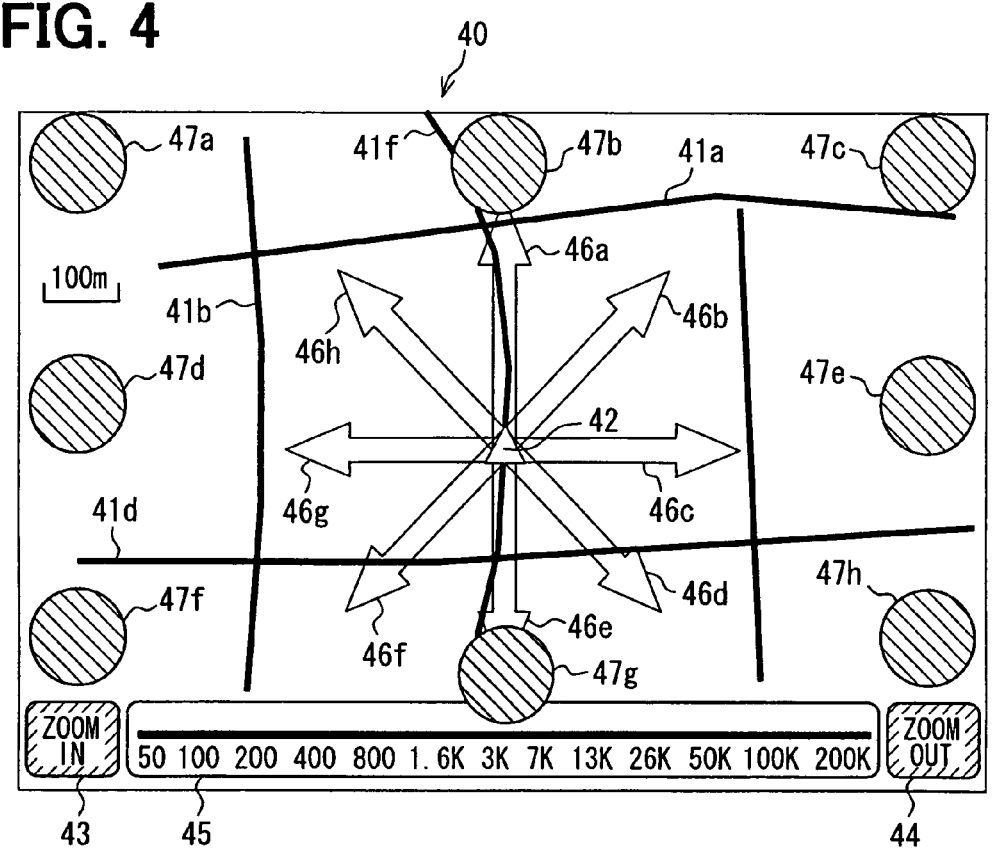
FIG. 4 is a drawing illustrating an example of a map display screen and an example of the details of touch panel operation.

At Step 170, the map is scrolled according to the operation with the touch panel. FIG. 4 illustrates an example 40 of the map display screen of the image display device 12 and an example of touch panel operation. In the map display screen 40, there are indicated roads 41*a* to 41*f*, a mark 42 indicating the current position of the relevant vehicle, a zoom in button 43, a zoom out button 44, and a scale indicator 45 so that they are visible to the user. At Step 170, the map image is scrolled when the following operation is performed: when a drag operation is performed with the touch panel or when an end of the touch panel, more specifically, the position of any of scroll activation buttons 47*a* to 47*h* is touched. The drag operation is an operation of moving a finger on the touch panel as indicated by any of the arrows 46*a* to 46*h* without detaching the finger from the touch panel. The scroll activation buttons 47*a* to 47*h* are invisible to the user.

When a drag operation in some direction is detected at Step 110, the control circuit 18 scrolls the map image by a default amount of scrolling in that direction at Step 170. This default amount of scrolling may be larger than the amount of every scrolling at Step 140 (e.g., twice the length of the display screen in that direction).

The amount of scrolling for the drag operation at Step 170 may be increased with increase in drag distance as represented by the following expression:

Default value×drag distance/length of entire screen

The default value cited here is, for example, twice the length of the display screen in the drag direction. The length of entire screen means the length of the display screen in the drag direction.

The amount of scrolling for the drag operation at Step 170 may be increased with increase in the scale of the currently displayed map image (i.e., increase in detailedness) as represented by the following expression:

Default actual distance×current scale×drag distance/length of entire screen

The default actual distance cited here is a predetermined distance as a basis (e.g., 10 kilometers). When the map image is scrolled by an amount of scrolling obtained by the above expression, for example, from the upper end to the lower end of the display screen, the following takes place: the map image is scrolled from top to bottom by the amount equivalent to the length representing the default actual distance.

When the operation of touching any of the scroll activation buttons 47a to 47h at an end of the display screen is detected at Step 110, the control circuit 18 carries out the following processing at Step 170: it scrolls the map image in the display screen to the direction of the operated button by a default amount of scrolling. This default amount of scrolling may be larger than the amount of every scrolling in the processing of Step 140 (e.g., twice the length of the display screen in that direction).

The amount of scrolling in response to the operation of touching a button at an end at Step 170 may be increased with increase in the scale of the currently displayed map image as represented by the following expression:

Default actual distance×current scale

When the map image is scrolled by an amount of scrolling obtained by the above expression, the following takes place: for example, when the scroll activation button 47g is touched, the map image is scrolled from top to bottom by the amount equivalent to the length representing the default actual distance.

The method for passing the drawing center to the drawing control processing 22a for scrolling the map image by a determined amount of scrolling at Step 170 is the same as described with respect to the processing of Step 140. When the processing of Step 170 is completed, one run of the scroll control program 100 is terminated.

At Step 180, an amount of scrolling corresponding to the size of a guided route is computed. Specifically, the map image is scrolled when the following operation is performed: when a drag operation is performed with the touch panel as indicated by arrows 46a to 46h, and when an end of the touch panel, more specifically, the position of any of the scroll activation buttons 47a to 47h is touched.

Figure 5:
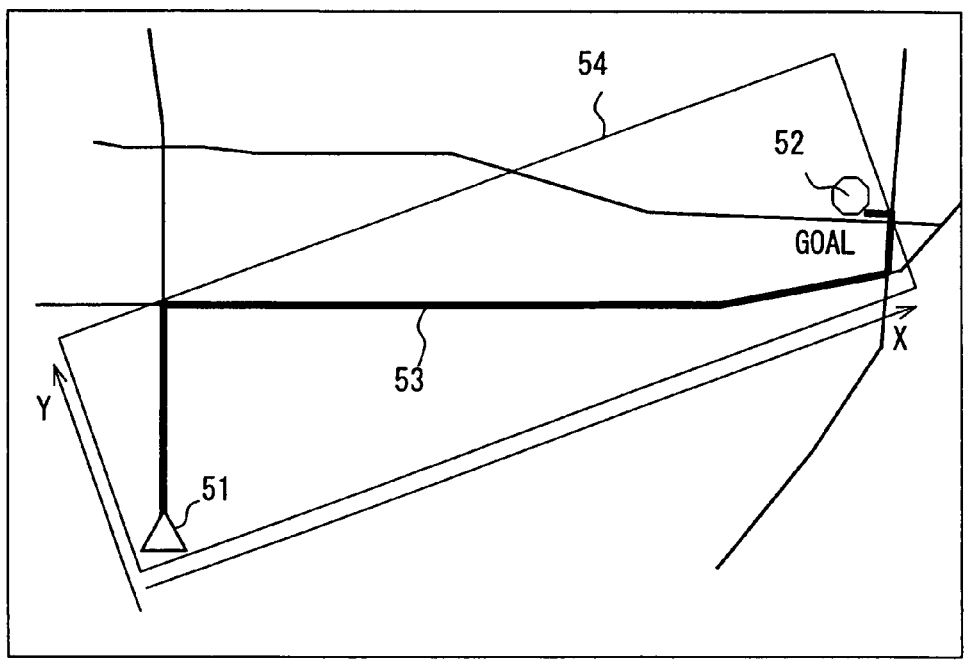
FIG. 5 is a drawing illustrating an example of a rectangle for determining the size of a guided route.

When a drag operation in some direction is detected at Step 110, the control circuit 18 adopts an amount derived by the following expression as the amount of scrolling at Step 180:

Size of guided route×current scale×split coefficient×
drag distance/length of entire screen In this expression, the split coefficient is a positive constant not less than 1 (e.g., ⅕). The size of guided route is an amount of length is an amount of length representing the actual overall size of a guided route. As illustrated in FIG. 5, for example, the following may be taken as a figure related to the size of a guided route: the smallest rectangle 54 of rectangles constructed of sides that embrace the full length of a guided route 53 starting at the current position mark 51 and ending at a destination 52 and are parallel with east-west lines and north-south lines. In this case, the size of the guided route is equivalent to the overall length of the rectangle 54 in the drag direction. When the map image is scrolled by an amount of scrolling obtained by this expression, the following takes place: for example, when the display screen is dragged from the north end to the south end, the map image is scrolled from top to bottom by ⅕ of the amount (e.g., 50 kilometers) of north-south movement of the guided route on the display screen.

When routing assistance is provided for 100 kilometers in the east-west direction and the scale of the displayed map is 1/20,000, the map image can only be scrolled by an amount equivalent to 1,400 meters by one scrolling operation at Step 140. (This is on the assumption that approximately 7 cm, or half the length of the screen is the maximum amount of one operation.) However, when a map is scrolled by an amount of scrolling obtained by this method at Step 180, it can be scrolled by an amount equivalent to approximately 20 kilometers and the user's desired map information can be quickly provided.

As an amount of scrolling in response to the operation of touching any of the scroll activation buttons 47a to 47h at an end, the amount derived by the following expression is adopted at Step 180:

Size of guided route×current scale×split coefficient×
default value

The default value is 1, for example. At this time, the size of guided route is the actual overall length of the rectangle 54 in the direction from the center of the map display screen 40 to the touched one of the scroll activation buttons 47a to 47h.

At Step 190, the map image is scrolled according to the amount of scrolling computed at Step 180 and the specified scroll direction. The method for passing the drawing center to the drawing control processing 22a for scrolling the map image by a determined amount of scrolling at Step 190 is the same as described with respect to the processing of Step 140. When the processing of Step 190 is completed, one run of the scroll control program 100 is terminated.

When the vehicle is not traveling (Step 120) and the user operates the touch panel (Step 110), the automobile navigation system 1 carries out the following processing by causing the control circuit 18 to execute the above-mentioned scroll control program 100. When the duration for which the user touches the panel in this operation is shorter than a reference time (i.e., the time between Step 110 and Step 130, e.g., 0.1 second) (Step 130), the map image is scrolled. The map image is scrolled so that the position on the map corresponding to the touched position becomes the drawing center (Step 140). When the duration of the touching operation is equal to or longer than the reference time (Step 130), the following takes place: the map image is scrolled continuously or stepwise from the center of the display screen toward the touched point by a larger amount with increase in the duration.

When the vehicle is traveling (Step 120) and the user operates the touch panel (Step 110), the automobile navigation system 1 carries out the following processing. It determines whether or not routing assistance is being presently provided (Step 160). When routing assistance is not being provided, the map image is scrolled by an amount of scrolling based on at least either of the scale of the displayed map image and the amount of drag for the touch panel or by a fixed amount of scrolling (Step 170). When routing assistance is being currently provided, the map image is scrolled by an amount of scrolling based on the following: the actual size of the guided route, the scale of the displayed map image, and the touch panel (and, if a drag operation is performed on the touch panel, the amount of drag) (Steps 180 and 190).

As mentioned above, the automobile navigation system 1 determines whether or not routing assistance is being provided and determines an amount of scrolling based on the result of the determination. With this construction, the automobile navigation system 1 can implement the following when the user performs some operation to scroll the map image being displayed on the image display device 12: it can vary the amount of scrolling depending on whether or not routing assistance is being provided.

When the vehicle is not traveling, the following takes place. When touch panel operation continues for a reference time or longer, the map is continuously scrolled according to the duration of the touch panel operation. When the operation is terminated in a short time, the map is scrolled by an amount equivalent to one step. When the vehicle is traveling, the amount of scrolling does not depend on the time for which a switch is pressed (i.e., the duration of operation).

When the result of determination of whether or not routing assistance is being provided is affirmative, the automobile navigation system 1 adopts as the amount of scrolling a larger value with increase in the size of a route for which routing assistance is being provided. This further enhances the convenience of scrolling operation for grasping a route.

When the result of determination of whether or not routing assistance is being provided is affirmative, the automobile navigation system 1 adopts as the amount of scrolling a larger value with increase in the scale of the map image being displayed. With this construction, the amount of scrolling can be increased with increase in the scale of the map being displayed, that is, with increase in the detailedness of the displayed map. Therefore, a map can be scrolled by an amount in accordance with an actual distance rather than a displayed distance.

The automobile navigation system 1 further determines whether or not the vehicle is traveling, and determines an amount of scrolling based on the result of the determination. With this construction, the amount of scrolling is larger when the vehicle is traveling than when the vehicle is not traveling even though the same operation is performed for scrolling.

When the result of determination of whether or not the vehicle is traveling is affirmative, the automobile navigation system 1 adopts as the amount of scrolling a larger value than when the result of the determination is negative in many cases. With this construction, the user's convenience in scrolling operation is enhanced.

Figure 6:
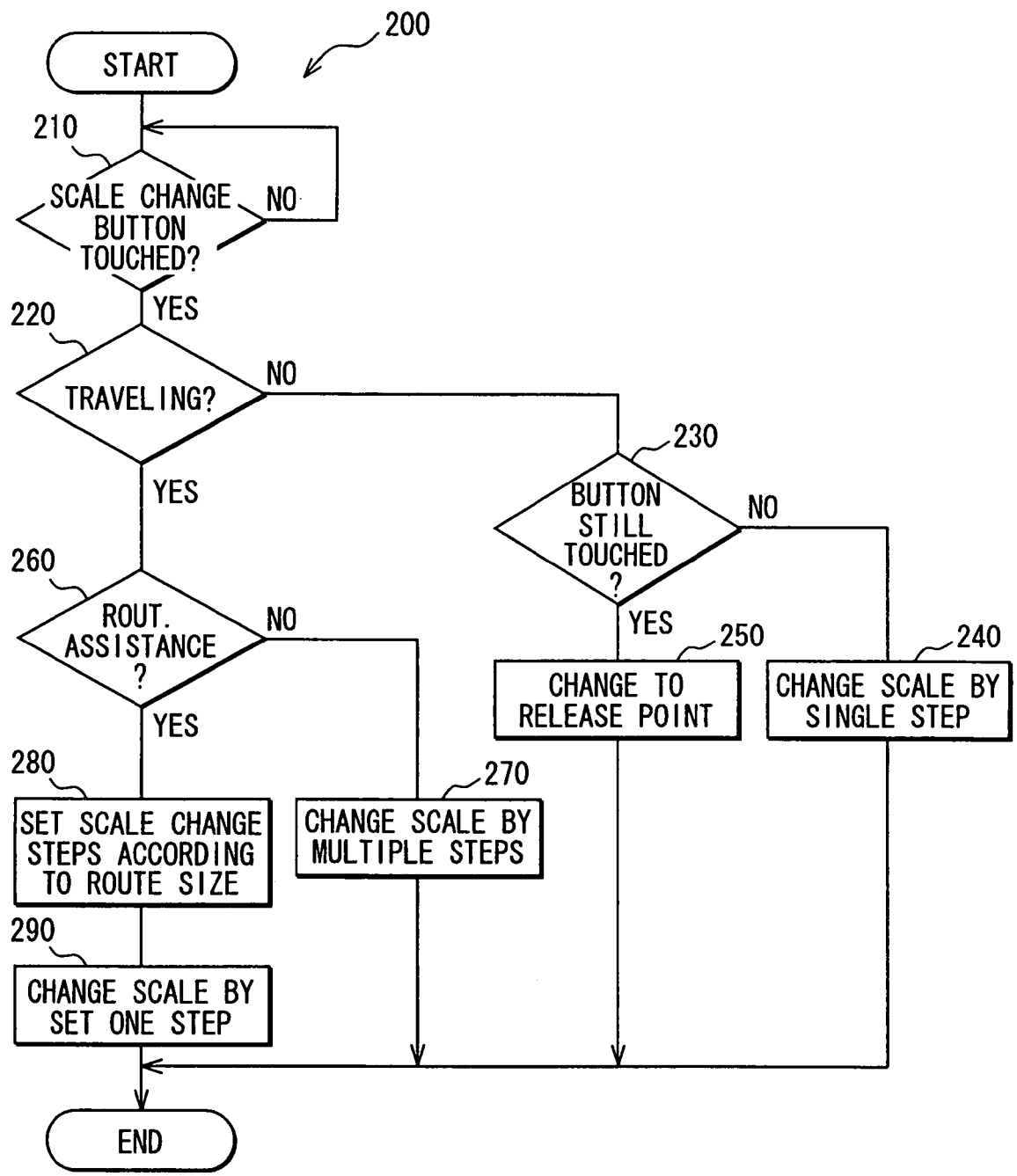
FIG. 6 is a flowchart of a scale control program executed by the control circuit.

The scale control processing 22c will be described in detail. In the scale control processing 22c, the control circuit 18 repeatedly executes the scale control program 200 illustrated in FIG. 6. The program is executed for determining a scale (i.e., for carrying out scale control) according to a user's operation with the touch panel of the operation switch group 13.

The scale control program 200 is executed as follows. At Step 210, the control circuit 18 waits until a button for scale change on the touch panel (e.g., the zoom in button 43 or the zoom out button 44 in FIG. 4) is touched. When it is detected that the button is touched, the control circuit 18 determines at Step 220 whether or not the relevant vehicle is traveling. When the vehicle is traveling, the control circuit 18 proceeds to Step 260. When the vehicle is not traveling, the control circuit 18 proceeds to Step 230.

At Step 230, it is determined whether the operation of touching the button for scale change is still going on. When the operation is going on, the control circuit 18 proceeds to Step 250. When the operation is not going on, the control circuit 18 proceeds to Step 240.

At Step 240, the scale of the map is changed by an amount equivalent to one predetermined default step of scale change. It is incremented when a button for zoom in is touched and decremented when a button for zoom out is touched. The predetermined default step of scale change may be, for example, 13 steps in substantially equal ratio within the range from 1/50 to 1/200,000 as in the scale indicator 45 illustrated in FIG. 4. The control circuit 18 passes an increased or decreased scale of the map image to the drawing control processing 22a, and the image display device 12 displays the map image to the passed scale. When the processing of Step 240 is completed, one run of the scale control program 200 is terminated.

At Step 250, the scale of the map image is continuously incremented or decremented until the touching operation is released, that is, until the user's finger is detached from the touch panel. More specific description will be given. The scale is periodically increased or decreased by one default step of scale change as long as the operation of touching a button for zoom in (e.g., the zoom in button 43) or a button for zoom out (e.g., the zoom out button 44) is going on. Each time the scale is incremented or decremented, the incremented or decremented scale is passed to the drawing control processing 22a. Thus, the scale of the map image is increased or decreased incessantly (and continuously or stepwise.) When the processing of Step 250 is completed, one run of the scale control program 200 is terminated.

When the result of determination made at Step 220 is affirmative, the control circuit 18 proceeds to Step 260, and determines whether or not the automobile navigation system 1 is carrying out the routing assistance processing 24. When the processing is in execution, the control circuit 18 proceeds to Step 280. When the processing is not in execution, the control circuit 18 proceeds to Step 270.

At Step 270, the scale of the map is changed by an amount equivalent to multiple predetermined default steps (e.g., three steps) of scale change. It is incremented when a button for zoom in is touched and decremented when a button for zoom out is touched. The method for passing a scale to the drawing control processing 22a for zoom in or zoom out is the same as described with respect to the processing of Step 240.

At Step 280, a step of scale change is set in accordance with the size of a guided route. This step of scale change can be obtained by divining the range between the predetermined maximum scale (e.g., a 1/2500 street map) and the minimum scale corresponding to the size of a guided route (e.g., in equal ratio) into multiple pieces (e.g., three to five). The minimum scale corresponding to the size of a guided route refers to the maximum scale to which the entire guided route can be embraced in the display screen. As an example, it will be assumed that the minimum scale corresponding to the size of a guided route is 1/700,000. In this case, steps of scale change of street map, 1/10,000, 1/40,000, 1/160,000, and 1/700,000 are set.

At Step 290, the scale of the map is changed by one step of scale change set at Step 280. It is incremented when a button for zoom in is touched and decremented when a button for zoom out is touched. The method for passing a scale to the drawing control processing 22a for zoom in or zoom out is the same as described with respect to the processing of Step 240. When the processing of Step 290 is completed, one run of the scale control program 200 is terminated.

When the vehicle is not traveling (Step 220) and the user operates a button 43, 44 for scale setting on the touch panel (Step 210), the automobile navigation system 1 carries out the following processing by causing the control circuit 18 to execute the above-mentioned scale control program 200. When the duration for which the user touches the button is shorter than a reference time (Step 230), the scale of the displayed map image is changed by one default step of scale change (Step 240). When the duration of the touching operation is equal to or longer than the reference time (Step 230), the following takes place: the scale of the displayed map image is changed by a larger number of default steps of scale change with increase in the duration (Step 250).

When the vehicle is traveling (Step 220) and the user operates a button 43, 44 for scale setting (Step 210), the automobile navigation system 1 determines whether or not routing assistance is being provided (Step 260). When routing assistance is not being provided, the scale of the displayed map image is changed by an amount equivalent to multiple default steps of scale change (Step 270). When routing assistance is being provided, the scale of the displayed map image is changed by one step (Step 290). This step is obtained by dividing the range between the minimum scale determined by the actual size of a guided route and the fixed maximum scale by a reference number of pieces (Step 280).

As mentioned above, the automobile navigation system 1 determines whether or not the vehicle is traveling, and determines an amount of change in the scale for map display based on the result of this determination. The automobile navigation system 1 causes the image display device 12 to display a map image. In addition, in response to the acceptance of an operation for scale change by the touch panel, the automobile navigation system 1 changes the scale of the displayed map image by the amount of change determined as mentioned above. With this construction, the automobile navigation system 1 can implement the following when the user performs some operation to change the scale of the map being displayed on the image display device 12: it can make the amount of scale change different between when the vehicle is traveling and when the vehicle is parked.

When the vehicle is not traveling and a button 43, 44 for scale setting on the touch panel is pressed, the automobile navigation system 1 carries out the following processing: when the button is kept pressed, it continuously changes the scale by a number of steps corresponding to the duration of the pressing operation; when the button is pressed only once, it changes the scale by one step. When the vehicle is traveling, the amount of scale change does not depend on the time for which the button 43 or 44 is pressed (i.e., the duration of operation).

When the result of determination of whether or not the vehicle is traveling is affirmative, the automobile navigation system 1 adopts as the amount of change a larger value than when the result of determination is negative. As a result, the amount of scale change is larger when the vehicle is traveling than when the vehicle is not traveling even though the same operation is performed.

The automobile navigation system 1 determines whether or not routing assistance is being provided by the routing assistance function, and determines an amount of change in the scale for map display based on the result of the determination. With this construction, the amount of scale change can be made different between when routing assistance is being provided and when it is not even though the same operation is performed for scale change.

When the result of determination of whether or not routing assistance is being provided is affirmative, the automobile navigation system 1 adopts as the amount of change a larger value with increase in the size of a route for which routing assistance is being provided. With this construction, the width of scale change is increased with increase in the size of a route for which routing assistance is provided. This further enhances the convenience of operation for scale change for grasping a route.

In the above embodiment, the automobile navigation system 1 corresponds to an example of a map display control device; and the scroll control program 100 and the scale control program 200 respectively correspond to an example of a map display control program. The touch panel of the operation switch group 13 corresponds to an example of an operation unit.

The control circuit 18 of the automobile navigation system 1 executes the routing assistance processing 24 and thereby functions as an example of a routing assistance means or unit. It executes the drawing control processing 22*a* and thereby functions as an example of a drawing control means or unit. The control circuit 18 carries out the processing of Step 160 of the scroll control program 100 and thereby functions as an example of a routing assistance determination means or unit; it carries out the processing of Step 120 and thereby functions as an example of a travel determination means or unit; and it carries out the processing of Steps 140, 150, 170, 180, and 190 and thereby functions as an example of a scroll determination means or unit.

The control circuit 18 carries out the processing of Step 260 of the scale control program 200 and thereby functions as an example of a routing assistance determination means or unit; it carries out the processing of Step 220 and thereby functions as an example of a travel determination means or unit; and it carries out the processing of Steps 240, 250, 270, 280, and 290 and thereby functions as an example of a scroll determination means or unit.

(Modifications)

Up to this point, description has been given to an embodiment of the invention. However, the scope of the invention is not limited to the above embodiment, and includes various modes that make it possible to carry out the functions of each feature of the invention.

Some examples will be taken. The smallest rectangle embracing an entire route need not be used for the size of a guided route. Instead, the overall length of a route or the span of a route in the north-south direction may be used. That is, any value may be used as long as it is a representative value representing the size of a route.

The routing assistance processing 24 may be so constructed that it simply displays a guided route on a map in such a manner that it can be discriminated from other roads. Or, it may be so constructed that it provides routing assistance only about guided intersections only by voice.

Such processing as the scroll control program 100 and the scale control program 200 may be carried out in response to not only touch panel operation but also the operation with a mechanical switch of the operation switch group 13. That is, the operation unit may be a touch panel or a mechanical switch.

At Steps 170 and 190, the control circuit 18 may scroll a map image in response to not only touching of any of the scroll activation buttons 47*a* to 47*h* but also touching of any position in the display screen.

In the scale control program 200, the control circuit 18 may be constructed so as to carry out the following processing: when it is detected at Step 210 that an area on the touch panel corresponding to the scale indicator 45 illustrated in FIG. 4 is dragged, the control circuit 18 carries out the processing of Step 220 and the following steps. At Steps 270 and 290 in this case, the scale may be further increased or decreased by a number of steps corresponding to the amount of drag.

The control circuit 18 may increase the amount of scrolling with increase in scale regardless of whether or not the relevant vehicle is traveling and whether or not routing assistance is being provided. With this construction, the following can be implemented when the user performs some operation to scroll the map image being displayed on the image display device 12 in the automobile navigation system 1: the amount of scrolling can be varied according to the scale of the map being displayed.

The map display control device need not be applied to an automobile navigation system 1, and it is applicable to any device as long as it is mounted in a vehicle and has an image display device loaded with maps.

Each or any combination of processes, steps, or means explained in the above can be achieved as a software unit (e.g., program, subroutine) and/or a hardware unit (e.g., circuit, integrated circuit, or FPGA whose circuitry is programmable), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the subject matter described herein are set out in the following clauses.

According to a first aspect, a map display control device for a vehicle may be provided as follows. An operation unit is included for accepting an operation by a user. A drawing control unit is included for causing an image display device to display a map image. A routing assistance unit is included for guiding the user along a route. A routing assistance determination unit is included for performing a determination as to whether or not the routing assistance unit is guiding. A scroll determination unit is included for determining an amount of scrolling based on a result from the determination by the routing assistance determination unit. Here, the drawing control unit scrolls the displayed map image by the amount of scrolling determined by the scroll determination unit when the operation unit accepts an operation for scrolling.

The amount of scrolling cited here refers to an amount of continuous or stepwise movement of a map relative to the size of a display screen, for example, lengths equivalent to one screen page, two screen pages, and 0.5 screen pages (e.g., 20 centimeters, 40 centimeters, and 10 centimeters). With this construction, the following can be implemented in an in-vehicle map display control device that causes an image display device to display a map: when a user performs some operation to scroll the map being displayed on the image display device, the amount of scrolling can be varied depending on whether or not routing assistance is being provided.

When the routing assistance unit is determined to be guiding, the scroll determination unit adopts as the amount of scrolling a larger value with increase in a size of the route along which the routing assistance unit is guiding the user. With this construction, the amount of scrolling can be increased with increase in the size of a route for which routing assistance is provided. This enhances the convenience of scrolling operation for grasping a route.

When the routing assistance unit is determined to be guiding, the scroll determination unit adopts as the amount of scrolling a larger value with increase in a scale of the map image being displayed. With this construction, the amount of scrolling can be increased with increase in the scale of the map being displayed, that is, with increase in the detailedness of the map being displayed. Therefore, a map can be scrolled in accordance with an actual distance rather than a displayed distance.

The map display control device may be constructed to include a travel determination unit for performing a determination as to whether or not the vehicle is traveling. Here, the scroll determination unit determines an amount of scrolling based on a result of the determination by the travel determination unit. With this construction, the amount of scrolling differs between when the vehicle is not traveling and when the vehicle is traveling even though the same operation is performed for scrolling.

When the vehicle is determined to be traveling, the scroll determination unit adopts as the amount of scrolling a value larger than when the vehicle is not determined to be traveling. With this construction, the amount of scrolling is larger when the vehicle is traveling than when the vehicle is not traveling even though the same operation is performed for scrolling.

The above first aspect may be adapted to a computer program product in a computer-readable medium in use for image display control in a map display control device for a vehicle. The product includes instructions of: displaying a map image in an image display device; performing a determination as to whether or not routing assistance is provided; determining an amount of scrolling based on a result from the determination as to whether or not routing assistance is provided; and scrolling the displayed map image by the determined amount of scrolling when an operation unit accepts an operation for scrolling.

According to a second aspect, a map display control device for a vehicle may be provided as follows. An operation unit is included for accepting an operation by a user. A drawing control unit is included for causing an image display device to display a map image. A scroll determination unit is included for determining a larger amount of scrolling with increase in a scale of the displayed map image. Here, the drawing control unit scrolls the map image by the amount of scrolling determined by the scroll determination unit when the operation unit accepts an operation for scrolling.

With this construction, the following can be implemented in an in-vehicle map display control device that causes an image display device to display a map: when a user performs some operation to scroll the map being displayed on the image display device, the amount of scrolling can be varied according to the scale of the map being displayed.

The above second aspect may be adapted to a computer program product in a computer-readable medium in use for image display control in a map display control device for a vehicle. The product includes instructions of: displaying a map image in an image display device; determining a larger amount of scrolling with increase in a scale of the displayed map image; and scrolling the map image by the determined amount of scrolling when the operation unit accepts an operation for scrolling.

According to a third aspect, a map display control device for a vehicle may be provided as follow. An operation unit is included for accepting an operation by a user. A drawing control unit is included for causing an image display device to display a map image. A travel determination unit is included for performing a determination as to whether or not the vehicle is traveling. A scale change determination unit is included for determining an amount of change in scale for map display based on a result of the determination by the travel determination unit. Here, the drawing control unit changes the scale of the displayed map image by the amount of change determined by the scale change determination unit when the operation unit accepts an operation for scale change.

With this construction, the following can be implemented in an in-vehicle map display control device that causes an image display device to display a map: when a user performs some operation to change the scale of the map being displayed on the image display device, the amount of scale change can be made different between when the vehicle is traveling and when the vehicle is parked.

When the vehicle is determined to be traveling, the scale change determination unit adopts as the amount of change a larger value than when the vehicle is not determined to be traveling. With this construction, the amount of scale change is larger when the vehicle is traveling than when the vehicle is not traveling even though the same operation is performed.

The map display control device may be provided with a routing assistance unit for guiding the user along a route and a routing assistance determination unit for performing a determination as to whether or not the routing assistance unit is guiding. Here, the scale change determination unit determines an amount of change in scale for the displayed map display based on a result of the determination by the routing assistance determination unit. With this construction, the amount of scale change can be made different between when routing assistance is being provided and when not even though the same operation is performed for scale change.

When the routing assistance unit is determined to be guiding, the scale change determination unit adopts as the amount of change a larger value with increase in a size of the route along which the routing assistance unit is guiding the user. With this construction, the width of scale change is increased with increase in the size of a route for which routing guidance is provided. This further enhances the convenience of operation for scale change for grasping a route.

The above third aspect may be adapted to a computer program product in a computer-readable medium in use for image display control in a map display control device for a vehicle. The product includes instructions of: displaying a map image in an image display device; performing a determination as to whether or not the vehicle is traveling; determining an amount of change in scale for map display based on a result of the determination as to whether or not the vehicle is traveling; and changing the scale of the displayed map image by the determined amount of change when the operation unit accepts an operation for scale change.

According to a fourth aspect, a map display control device for a vehicle may be provided as follows. An operation unit is included for accepting an operation by a user. A drawing control unit is included for causing an image display device to display a map image. A routing assistance unit is included for guiding the user along a route. A routing assistance determination unit is included for performing a determination as to whether or not the routing assistance unit is guiding. A scale change determination unit is included for determining an amount of change in scale for map display based on a result from the determination by the routing assistance determination unit. Here, the drawing control unit changes the scale of the displayed map image by the determined amount of change when the operation unit accepts an operation for scale change.

With this construction, the following can be implemented in an in-vehicle map display control device that causes an image display device to display a map: when a user performs some operation to change the scale of the map being displayed on the image display device, the amount of scale change can be varied depending on whether or not routing assistance is being provided to guide the driver to his/her destination.

The above fourth aspect may be adapted to a computer program product in a computer-readable medium in use for image display control in a map display control device for a vehicle. The product includes instructions of: displaying a map image in an image display device; performing a determination as to whether or not routing assistance is provided; determining an amount of change in scale for map display based on a result from the determination as to whether or not routing assistance is provided; and changing the scale of the displayed map image by the determined amount of change when the operation unit accepts an operation for scale change.

In the map display control device according to any of the first to fourth aspects mentioned above, the operation unit may be a touch panel installed over a display screen of the image display device.

It will be obvious to those skilled in the art that various changes may be made in the above-described embodiments of the present invention. However, the scope of the present invention should be determined by the following claims.

What is claimed is:

1. A map display control device for a vehicle, the device comprising:
   an operation unit for accepting an operation by a user;
   a drawing control unit for causing an image display device to display a map image;
   a routing assistance unit for guiding the user along a route;
   a routing assistance determination unit for performing a determination as to whether or not the routing assistance unit is guiding; and
   a scroll determination unit for determining an amount of scrolling by a predetermined scrolling operation based on a result from the determination by the routing assistance determination unit, wherein
   the drawing control unit being further configured to scroll the displayed map image by the amount of scrolling determined by the scroll determination unit when the operation unit accepts an operation for scrolling, wherein
   the amount of scrolling by the predetermined scrolling operation determined by the scroll determination unit when the routing assistance unit is determined to be guiding is greater than the amount of scrolling by the predetermined scrolling operation determined by the scroll determination unit when the routing assistance unit is determined not to be guiding.

2. The map display control device of claim 1, wherein when the routing assistance unit is determined to be guiding, the scroll determination unit adopts as the amount of scrolling a larger value with increase in a size of the route along which the routing assistance unit is guiding the user.

3. The map display control device of claim 1, wherein when the routing assistance unit is determined to be guiding, the scroll determination unit adopts as the amount of scrolling a larger value with increase in a scale of the map image being displayed.

4. The map display control device of claim 1, further comprising:
   a travel determination unit for performing a determination as to whether or not the vehicle is traveling, wherein
   the scroll determination unit determines the amount of scrolling based on a result of the determination by the travel determination unit.

5. The map display control device of claim 4, wherein when the vehicle is determined to be traveling, the scroll determination unit adopts as the amount of scrolling a value larger than when the vehicle is not determined to be traveling.

6. The map display control device of claim 5, wherein when the vehicle is determined to not be traveling, the scroll determination unit adopts a duration of the operation of the operation unit as the amount of scrolling when the operation continues for at least a predetermined reference time, and the scroll determination unit uses one step as the amount of scrolling when the operation of the operation unit does not continue for at least the predetermined reference time.

7. The map display control device of claim 5, wherein when the vehicle is determined to not be traveling, the map image is scrolled continuously or stepwise from a center of the image display device when the operation of the operation unit continues for at least a predetermined reference time, and the map image is scrolled so that a position on the map image corresponding to a position where the operation unit was operated becomes centered when the operation of the operation unit does not continue for at least the predetermined reference time.

8. The map display control device of claim 4, wherein when the vehicle is determined to not be traveling, the scroll determination unit adopts a duration of the operation of the operation unit as the amount of scrolling when the operation continues for at least a predetermined reference time, and the scroll determination unit uses one step as the amount of scrolling when the operation of the operation unit does not continue for at least the predetermined reference time.

9. The map display control device of claim 4, wherein when the vehicle is determined to not be traveling, the map image is scrolled continuously or stepwise from a center of the image display device when the operation of the operation unit continues for at least a predetermined reference time, and the map image is scrolled so that a position on the map image corresponding to a position where the operation unit was operated becomes centered when the operation of the operation unit does not continue for at least the predetermined reference time.

10. A computer program product stored in a non-transitory computer-readable medium in use for image display control in a map display control device for a vehicle, the product comprising instructions of:
displaying a map image in an image display device;
performing a determination as to whether or not routing assistance is provided;
determining an amount of scrolling by a predetermined scrolling operation based on a result from the determination as to whether or not routing assistance is provided; and
scrolling the displayed map image by the determined amount of scrolling when an operation unit accepts an operation for scrolling, wherein
the amount of scrolling by the predetermined scrolling operation determined when the routing assistance is determined to be provided is greater than the amount of scrolling by the predetermined scrolling operation determined when the routing assistance is determined not to be provided.

11. The computer program product of claim 10, wherein when the routing assistance is determined to be provided, the amount of scrolling is a larger value with increase in a size of the route along which the routing assistance is guiding the user.

12. The computer program product of claim 10, wherein when the routing assistance is determined to be provided, the amount of scrolling is a larger value with increase in a scale of the map image being displayed.

13. The computer program product of claim 10, further comprising:
performing a determination as to whether or not the vehicle is traveling, wherein
the amount of scrolling is determined based on a result of the determination as to whether or not the vehicle is traveling.

14. The computer program product of claim 13, wherein when the vehicle is determined to be traveling, the scroll determination unit adopts as the amount of scrolling a value larger than when the vehicle is not determined to be traveling.

15. The computer program product of claim 14, wherein when the vehicle is determined to not be traveling, the scroll determination unit adopts a duration of the operation of the operation unit as the amount of scrolling when the operation continues for at least a predetermined reference time, and the scroll determination unit uses one step as the amount of scrolling when the operation of the operation unit does not continue for at least the predetermined reference time.

16. The computer program product of claim 14, wherein when the vehicle is determine to not be traveling, the map image is scrolled continuously or stepwise from a center of the image display device when the operation of the operation unit continues for at least a predetermined reference time, and the map image is scrolled so that a position on the map image corresponding to a position where the operation unit was operated becomes centered when the operation of the operation unit does not continue for at least the predetermined reference time.

17. The computer program product of claim 13, wherein when the vehicle is determined to not be traveling, a duration of the operation of the operation unit is adopted as the amount of scrolling when the operation continues for at least a predetermined reference time, and one step is used as the amount of scrolling when the operation of the operation unit does not continue for at least the predetermined reference time.

18. The computer program product of claim 13, wherein when the vehicle is determine to not be traveling, the map image is scrolled continuously or stepwise from a center of the image display device when the operation of the operation unit continues for at least a predetermined reference time, and the map image is scrolled so that a position on the map image corresponding to a position where the operation unit was operated becomes centered when the operation of the operation unit does not continue for at least the predetermined reference time.

* * * * *